Patented Oct. 13, 1931

1,826,811

UNITED STATES PATENT OFFICE

EDUARD MUENCH, OF LUDWIGSHAFEN-ON-THE-RHINE, GERMANY, AND THEODOR VOLTZ, OF BASLE, SWITZERLAND, ASSIGNORS TO GENERAL ANILINE WORKS, INC., OF NEW YORK, N. Y., A CORPORATION OF DELAWARE

REDUCTION OF ORGANIC CARBONYL COMPOUNDS

No Drawing. Application filed August 1, 1928, Serial No. 296,862, and in Germany August 12, 1927.

We have found that vat dyestuffs, or other organic substances which like the vat dyestuffs, contain reducible carbonyl or quinone groups, are very easily and smoothly reduced if treated, in the presence of organic bases, with metals and sulfurous acid which expression also includes acid salts of sulfurous acid with or without the use of diluents.

The easy and quantitative reduction by means of metals and sulfurous acid, which takes place almost instantaneously even when anhydrous bases are employed, has the advantage that the resulting leuco compounds can be at once transformed in the reaction mixture, into esters by treatment with acylating agents, such as chlorsulfonic acid or esters of same, phosphorus oxychlorid, acetic anhydrid and the like. In this way not only is the work simplified, but the products are also often obtained in a purer state and in a higher yield than by other methods. In some cases the acylating agent may be added already in the course of the reduction or immedately thereafter directly to the reaction mixture. The reduction products may also be first isolated by filtra ion or other manner of removing the products as they separate out from the reaction mixture in crystalline form during the reaction or on cooling or diluting the reaction mixture, or distilling off the bases and the diluents, if such be added, preferably under diminished pressure.

The metals preferably to be employed according to the present invention comprise copper, zinc, iron, aluminium, and the like, used either separately or in mixtures, or also with the addition of other metals such as magnesium or calcium; they are preferably employed in a finely divided state such as metallic powder. The organic bases may be for example, pyridine, aniline, dimethylaniline, triethanolamine and the like.

The following examples will further illustrate the nature of the said invention which however is not limited thereto. The parts are by weight.

Example 1

10 parts of sulfurous acid are introduced into 50 parts of anhydrous pyridine, whereupon 10 parts of 5.5', 7.7'-tetrabromindigo and 6 parts of copper powder are added at about 15° C. The mixture is stirred while preventing contact with air, for example in an atmosphere of coal gas, carbon dioxid, or other inert gas. The reduction of the dyestuff commences at once, the temperature rises to about 30° C. and after a very short time the reduction is complete and a golden yellow solution formed.

On dilution with water, the leuco compound separates out as a lemon yellow substance, which, if required, is subjected to further treatment for example to acetylation. The resulting solution of the leuco compound may also directly be treated with the suitable amount of acetic anhydrid, whereupon the quantitative acetylation of the leuco compound, accompanied by a spontaneous rise in temperature, occurs in a few minutes. If the acetic anhydrid be replaced by chlorsulfonic acid, a good yield of the sulfuric ester of leuco-5.5', 7.7'-tetrabromindigo is obtained.

Example 2

5 parts by weight of dimethoxydibenzanthrone are suspended in a solution of 50 parts of pyridine and 10 parts of sulfurous acid, and 4 parts of copper powder are added to the mixture at 15° C. The reduction begins at once. The mixture is stirred at from 25° to 30° C. while preventing contact with air, whereupon the dark red solution of the leuco compound is formed. Increasing the temperature, for example, to 60° C., accelerates the reduction. If 10 parts of acetic anhydrid be added to the resulting solution at about 30° C., the acetylation of the leuco compound takes place in a few minutes, and on the resulting orange red solution being diluted with water, the acetyl compound is thrown down as a red, inoxidisable precipitate.

Example 3

A mixture of 25 parts by weight of pure pyridine of the firm of (Merck), 5 parts of sulfurous acid and 5 parts of 5.5', 7.7'-tetrabromindigo is treated with a gradual addition of 2 parts of zinc dust, at low temperatures, down to 10° C. and while preventing contact with air. The mixture soon acquires a greenish color, and on removal from cooling liquid, the dyestuff is rapidly reduced, the temperature rising spontaneously to from 35° to 40° C., a yellow suspension being obtained. The lemon yellow leuco compound, which separates out almost completely on dilution with water, can easily be subjected to further treatment, being comparatively stable in air.

If the pyridine be replaced by other bases, as for example a commercial mixture of pyridine bases, or dimethyl-aniline or aniline or if the zinc be replaced by other metals such as iron, aluminium, or metallic mixtures like Devarda's alloy consisting of 45 parts of aluminium, 50 parts of copper and 5 parts of zinc (see, for example, "Chemiker Zeitung" (1892) Vol. 16, p. 1952), reduction also takes place. In such cases the presence of small amounts of water and increased temperatures often has a favourable influence on the velocity of the reduction.

Other vat dyestuffs, such as indigo, thioindigo, and the like, or other reducible substances, such as arylidoquinones, phenanthrenequinone, and many others, can also be reduced in a similar manner.

What we claim is:

1. The process of manufacturing reduction products which comprises subjecting an organic compound containing a reducible carbonyl group to the action of sulfurous acid and a metal in the presence of an organic base.

2. The process of manufacturing reduction products which comprises subjecting an organic compound containing a reducible carbonyl group to the action of sulfurous acid and a metal in the presence of an organic base and treating the reaction mass with an acylating agent.

3. The process which comprises subjecting vat dyestuffs to the action of sulfurous acid and a metal in the presence of an organic base.

4. The process which comprises subjecting vat dyestuffs to the action of sulfurous acid and a metal selected from the group consisting of copper and zinc, in the presence of an organic base.

In testimony whereof we have hereunto set our hands.

EDUARD MUENCH.
THEODOR VOLTZ.